US007619986B2

(12) United States Patent
Kim

(10) Patent No.: US 7,619,986 B2
(45) Date of Patent: Nov. 17, 2009

(54) METHOD FOR CONTROLLING DEVICE BASED ON IEEE 1394 INTERFACE

(75) Inventor: Hyung-Jin Kim, Seoul (KR)

(73) Assignee: LG Electronics Inc., Seoul (KR)

(*) Notice: Subject to any disclaimer, the term of this patent is extended or adjusted under 35 U.S.C. 154(b) by 498 days.

(21) Appl. No.: 11/041,368

(22) Filed: Jan. 25, 2005

(65) Prior Publication Data

US 2005/0163167 A1 Jul. 28, 2005

(30) Foreign Application Priority Data

Jan. 27, 2004 (KR) ............... 10-2004-0005127

(51) Int. Cl.
*H04L 12/28* (2006.01)
*G06F 13/20* (2006.01)
(52) U.S. Cl. .............. 370/254; 370/392; 710/313
(58) Field of Classification Search .......... 386/46, 386/126, 33; 358/1.15; 400/61; 710/1, 3, 710/19, 305; 370/537, 254; 702/188; 709/218, 709/230, 244, 249
See application file for complete search history.

(56) References Cited

U.S. PATENT DOCUMENTS

| 6,832,267 | B2* | 12/2004 | Igarashi .................. 710/3 |
| 6,842,814 | B1* | 1/2005 | Kim et al. ............... 710/305 |
| 7,403,982 | B2* | 7/2008 | Tanaka et al. ........... 709/220 |
| 2002/0004711 | A1* | 1/2002 | Sato et al. ............... 702/188 |
| 2006/0056799 | A1* | 3/2006 | Na et al. ................. 386/46 |

* cited by examiner

*Primary Examiner*—Gregory B Sefcheck
*Assistant Examiner*—Nima Mahmoudzadeh
(74) *Attorney, Agent, or Firm*—Birch, Stewart, Kolasch & Birch, LLP

(57) ABSTRACT

A method for controlling a device based on an IEEE 1394 interface includes the steps of: a) investigating a packet received from a counterpart device via the IEEE 1394 interface; b) parsing a control field of the packet, and determining category information of a specification applied to the device; c) processing a command using a Home Audio Video Interoperability (HAVi) process, if the specification is determined to be the HAVi specification through another specification.

5 Claims, 6 Drawing Sheets

"Background Art"

"Background Art"

"Background Art"

FIG. 5
"Background Art"

| CTS code msb | | | lsb | CTS |
|---|---|---|---|---|
| 0 | 0 | 0 | 0 | AV/C |
| 0 | 0 | 0 | 1 | reserved for CAL |
| 0 | 0 | 1 | 0 | reserved for EHS |
| 0 | 0 | 1 | 1 | HAVi |
| 0 | 1 | 0 | 0 | (Reserved) |
| 1 | 1 | 0 | 1 | |
| 1 | 1 | 1 | 0 | Vendor Unique |
| 1 | 1 | 1 | 1 | Extended CTS |

FIG. 6

| CTS code msb | | | lsb | CTS |
|---|---|---|---|---|
| 0 | 0 | 0 | 0 | AV/C |
| 0 | 0 | 0 | 1 | reserved for CAL |
| 0 | 0 | 1 | 0 | reserved for EHS |
| 0 | 0 | 1 | 1 | HAVi |
| 0 | 1 | 0 | 0 | HAVi through AV/C |
| 0 | 1 | 0 | 1 | (Reserved) |
| 1 | 1 | 0 | 1 | |
| 1 | 1 | 1 | 0 | Vendor Unique |
| 1 | 1 | 1 | 1 | Extended CTS |

METHOD FOR CONTROLLING DEVICE BASED ON IEEE 1394 INTERFACE

BACKGROUND OF THE INVENTION

1. Field of the Invention

The present invention relates to a method for controlling a device based on an IEEE 1394 interface, and more particularly to a method for controlling a device based on an IEEE 1394 interface (I/F), which determines which one of specifications is associated with a current command in a system in which Home Audio Video Interoperability (HAVi) and Audio Video/Control (AV/C) specifications are simultaneously implemented, correctly processes the current command according to the determined result, and allows different devices to be interoperable with each other via the IEEE 1394 interface.

2. Description of the Related Art

IEEE 1394 technologies were initially established by IEEE standardization references in 1995, and are indicative of high-speed serial bus communication technologies capable of stably supporting a transfer rate of 400 Mbps according to the IEEE 1394a standard acting as a supplementary standard of the IEEE 1394 standard. With the development of IEEE 1394 high-performance serial buses, digital technologies have been rapidly developed. For example, as household appliances have been digitalized, a variety of household appliances have been designed to use a communication network such as the Internet. As digital camcorders and Digital Versatile Discs (DVDs) have rapidly come into widespread use, the above-mentioned technologies have also rapidly developed. As the Internet and associated technologies have rapidly come into widespread use throughout the world since the beginning of the 1990's, home networking technologies have been introduced as efficient household network utilization methods. As computers have rapidly come into widespread use in individual houses, digital household appliances and computer peripheral devices are combined in one group, such that a home network system can be configured.

Based on data communication between Personal Computers (PCs), the home network system can communicate with a variety of multimedia household appliances, for example, digital camcorders, DVDs, and High Definition Televisions (HDTVs), etc. Also, the home network system can provide synthetic communication services, for example, an information exchange service between different devices, an information search service, and an information fabrication service, etc. Most of the above-mentioned services are comprised of a variety of multimedia information services, require rapid response characteristics, communication network extensibility, and communication network reliability in order to implement a high-quality real-time video service, and must facilitate service management operations. In the case of accommodating new multimedia services having the above-mentioned characteristics, a conventional packet communication network having a limited lower transmission network speed has difficulty in providing users with multimedia services, such that improved technologies capable of providing users with high-quality multimedia services are newly proposed.

The most important characteristic of the IEEE 1394 interface is considered to be its rapid transfer rate. The IEEE 1394 interface can provide users with three transfer rates (i.e., 100 Mbps, 200 Mbps, and 400 Mbps) according to a variety of operation modes. Utilizing transfer rates of 800 Mbps to 1.6 Gbps, which are currently under development, there is no problem in transmission of digital audio or moving image information, such that multimedia peripheral devices (e.g., scanners, digital cameras, and digital video cameras, etc.) can be directly connected to the IEEE 1394 interface, and can be used in real time. A high transfer rate mode from among the above-mentioned three transfer rate modes has compatibility with lower transfer rate modes.

In more detail, the 200 Mbps mode can be operated at 100 Mbps, and the 400 Mbps mode can be operated in both 100 Mbps and 200 Mbps modes. In this manner, the above-mentioned modes are not limited to only compatibility among the above-mentioned modes and are further applicable, to other applications. Provided that a computer having a transfer rate of 400 Mbps, a printer having a transfer rate of 200 Mbps, and an optical disc having a transfer rate of 100 Mbps are connected to the same IEEE 1394 interface cable, the computer, the printer, and the optical disc can be normally operated and can communicate with one another, because peripheral devices communicating with each other or computers for data communication are operated simultaneously by adjusting transfer rates.

A second important characteristic of the IEEE 1394 interface is considered to be its excellent bi-directional communication. In more detail, an Integrated Chip (IC) capable of controlling the IEEE 1394 interface can be installed in individual peripheral devices, such that the IEEE 1394 interface may show the best performance in application fields such as video conferencing using a PC, etc. Therefore, although appliances based on the IEEE 1394 interface have not yet been introduced to the market, it can be readily recognized that the IEEE 1394 interface could be widely used to connect a variety of household products to a computer due to the increasing use of digitalized video and audio products.

A third important characteristic of the IEEE 1394 interface is to support a Plug-and-Play (PnP) operation, and to perform a Hot-Plugging operation. The IEEE 1394 protocol has been designed to immediately cope with unexpected variation of several systems interconnected via a cable. The IEEE 1394 interface can be freely connected to or separated from any peripheral device currently in use, and continuously performs current operations without affecting other devices. Therefore, a user need not perform the shutdown of a computer, need not power off the computer, need not install peripheral devices, and need not provide the computer with a power-supply voltage. If any peripheral device is connected to or separated from the IEEE 1394 interface on the condition that a daisy chain is currently operated, format information is changed, such that all information is reset, and peripheral devices of the daisy chain are assigned new addresses. Thereafter, peripheral devices inform all devices connected to the chain of their position information, and enter a standby mode such that they can be re-operated.

A system based on a daisy-chain-shaped interface such as a Small Computer Systems Interface (SCSI) or an Ethernet system for constructing a Local Area Network (LAN) must use a terminator at all times. If the above-mentioned terminator is not properly set in the above-mentioned systems, there arise malfunctions in the above-mentioned systems. The IEEE 1394 interface need not use the terminator, because it uses a Point-to-Point bus technique instead of using the daisy chain.

A fourth important characteristic of the IEEE 1394 interface substitutes a general large and expensive cable into a thin cable such that a user can easily use the IEEE 1394 interface. The IEEE 1394 cable is classified into a cable including two pairs of signal transmission lines, each of which is comprised of two-strand pairs as shown in FIGS. 1a~1b, and three pairs of cables, each of which includes two pairs of signal transmission lines and positive(+) and negative(−) power-supply lines. The power-supply lines provide DC 8V~40V, and can transmit the value of 1.5 A, such that an external power-supply unit for providing a device with a power-supply signal can be selectively used.

The IEEE 1394 is indicative of hardware and software standards, each of which is comprised of a physical layer, a link layer, and a transaction layer. FIG. 2 shows the relationship among the physical, link, and transaction layers and their unique functions. Typically, the IEEE 1394 host adapter is assigned to physical and link layers, such that it manages the transaction layer and performs a bus management function. The physical layer performs a mediation function for acquiring a right to mainly use a serial bus. The link layer controls a bus cycle. The transaction layer performs basic functions of a network device, i.e., reading and writing functions, and performs a bus control function such as a resource management function needed for isochronous transmission.

The IEEE 1394 cable includes a signal line for transmitting a data signal and a timing signal line for data synchronization. The signal line and the timing signal line are each comprised of one pair of lines, are used in a half-duplex mode, and are each comprised of one pair of power-supply lines. Data transmission is performed at high speed, such that the timing signal line is adapted to prevent a transmission bandwidth from being doubled on the condition that timing information such as Manchester coding of data is contained in the transmitted data. Otherwise, the IEEE 1394 interface is automatically assigned an ID, differently from the SCSI. The method for automatically assigning the ID to the IEEE 1394 interface will be described as follows. In more detail, an ID of a port having the lowest number of a root node is first determined, and then individual IDs of leaf nodes connected to a lower part of the root node are sequentially determined. A digital Video Cassette Recorder (VCR) leaf node determines its ID to be '0', includes the determined ID in a packet, and broadcasts the packet including the determined ID to overall nodes. Thereafter, the lowest node, denoted by "IEEE 1394 fixed disk drive", determines its ID to be '1', includes the determined ID in a packet, and broadcasts the packet including the determined ID to overall nodes. In this case, the node ID is indicative of the number of broadcast packets received until each node determines its own ID in such a way that individual nodes determine their unique IDs.

Models to which a conventional IEEE 1394 interface is applied must use middleware such as an AV/C or HAVi module to control counterpart devices, and a variety of products must be manufactured using the middleware. In the case of using the AV/C command set module (hereinafter referred to as "AV/C module"), the above-mentioned products perform a variety of control commands using the AV/C module such that they can control counterpart devices using the IEEE 1394 interface (I/F).

In the case of using the HAVi architecture module (hereinafter referred to as an "HAVi module"), the counterpart devices transmit the set of control commands, etc. according to HAVi specifications such that the above-mentioned products can be controlled.

FIG. 4 shows the relationship among an IEEE 1394 specification, a general specification of AV/C digital interface command sets, an HAVi specification, and an IEC61883 specification. Referring to FIG. 4, the IEEE 1394 protocol is assigned to the least significant end (i.e., the lowest order end) such that it takes charge of the last communication interface, middleware such as an AV/C or HAVi module is positioned on the IEEE 1394 protocol such that it provides a method for controlling counterpart devices. A conventional method for processing commands generated between devices is indicative of a method for classifying individual middleware packages in such a way that the middleware is classified according to a Command/transaction Set (CTS) prescribed in the IEC61833 specification.

FIG. 2 shows a CTS code table prescribed in the IEC61833-1 specification. In FIG. 2, a CTS denoted by "0000" is indicative of an AV/C-associated command, and the other CTS denoted by "0011" is indicative of an HAVi-associated command. In this case, a CTS field of an AKE-associated command may also be denoted by "0000".

Provided that a counterpart system of a device based on the HAVi technology is implemented with a Legacy AV Device (LAV) or a Base AV Device (BAV), the above-mentioned device is designed to perform communication using only AV/C command sets. The above-mentioned operation indicates that the device is unable to distinguish among different specifications using only conventional CTS codes. Therefore, technologies prescribed in the HAVi specification have difficulty in implementing compatibility of several specifications, resulting in the occurrence of serious disadvantages.

The above-mentioned conventional method has difficulty in distinguishing among individual commands in association with category information of specifications in a system in which HAVi and AV/C specifications are simultaneously implemented. In conclusion, there must be newly developed a method for determining which one of specifications is associated with a current command in the above-mentioned system in which HAVi and AV/C specifications are simultaneously implemented.

SUMMARY OF THE INVENTION

Therefore, the present invention has been made in view of the above problems, and it is an object of the present invention to provide a method for controlling a device based on an IEEE 1394 interface, which determines which one of specifications is associated with a current command in a system in which HAVi and AV/C specifications are simultaneously implemented, correctly processes the current command according to the determined result, and allows different devices to be interoperable with each other via the IEEE 1394 interface.

In accordance with the present invention, the above and other objects can be accomplished by a method for controlling a device based on an IEEE 1394 interface, comprising the steps of: a) investigating a packet received from a counterpart device via the IEEE 1394 interface; b) parsing a control field of the packet, and determining category information of a specification applied to the device; c) processing a command using a Home Audio Video Interoperability (HAVi) process, if the specification is determined to be the HAVi specification through an another specification.

Preferably, the step b) for determining the category information of the specification applied to the device uses a CTS code.

Preferably, a unique CTS code assigned to a device implemented with the HAVi specification through the another specification includes 4 bits, and is indicative of any code selected from among a plurality of values 0100~1101.

Preferably, the unique CTS code assigned to the device implemented with the HAVi specification through the another specification includes 4 bits, and is indicative of a specific value of 0100.

Preferably, the received packet is indicative of an asynchronous packet.

BRIEF DESCRIPTION OF THE DRAWINGS

The above and other objects, features and other advantages of the present invention will be more clearly understood from the following detailed description taken in conjunction with the accompanying drawings, in which:

FIG. 5 shows a table in which CTS codes are defined in the IEC61833-1 specification;

FIG. 6 shows a table in which CTS codes are defined in accordance with the present invention;

DESCRIPTION OF THE PREFERRED EMBODIMENTS

Figure 1A:
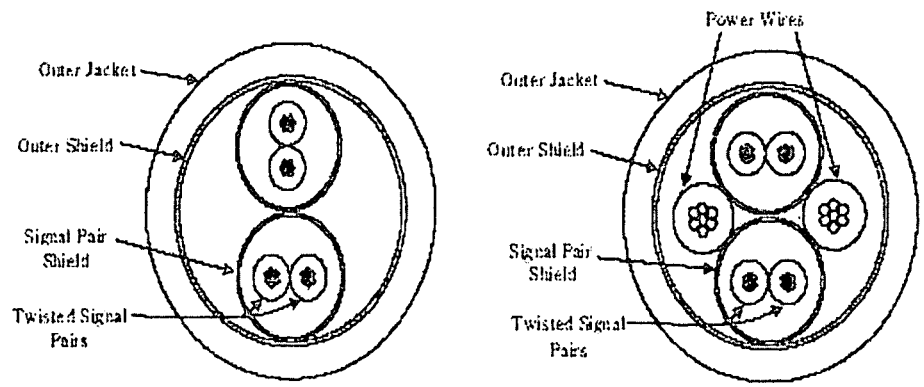
FIG. 1a is a cross-sectional view illustrating IEEE 1394 cables including 4 pins and 6 pins.
Figure 1B:
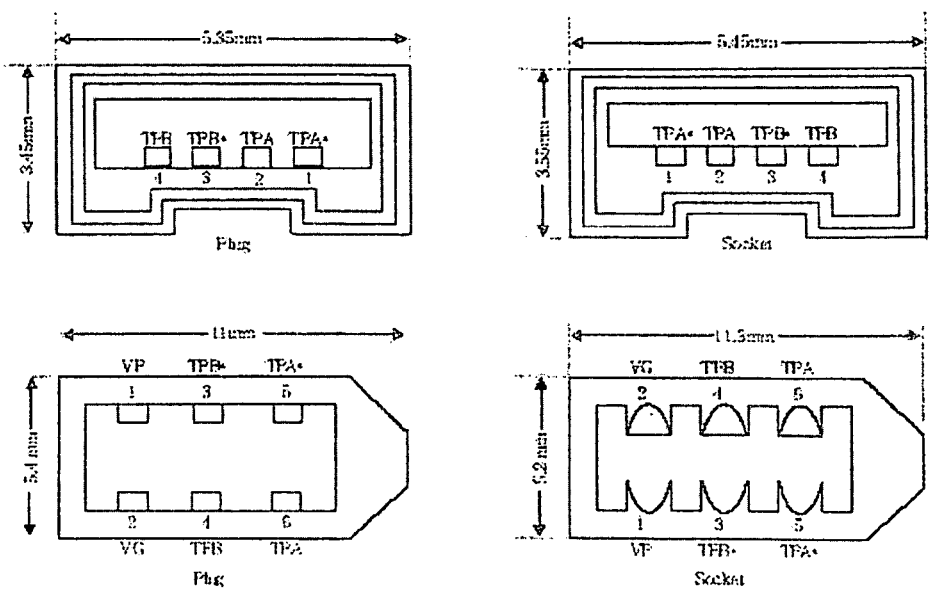
FIG. 1b is a cross-sectional view illustrating IEEE 1394 plugs including 4 pins and 6 pins.
Figure 2:
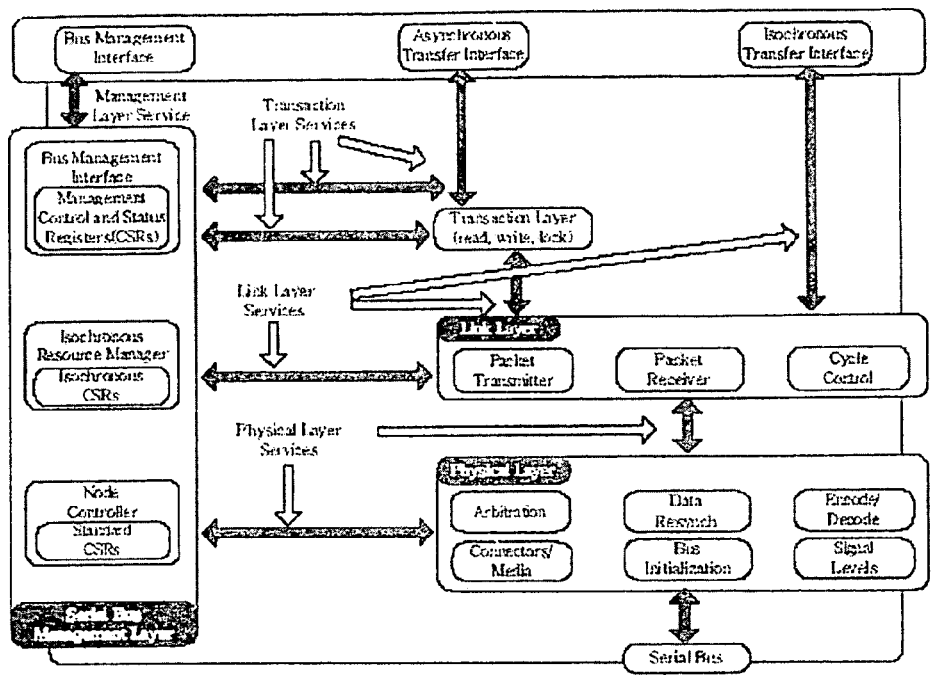
FIG. 2 is a conceptual diagram illustrating an IEEE 1394 protocol.
Figure 3:
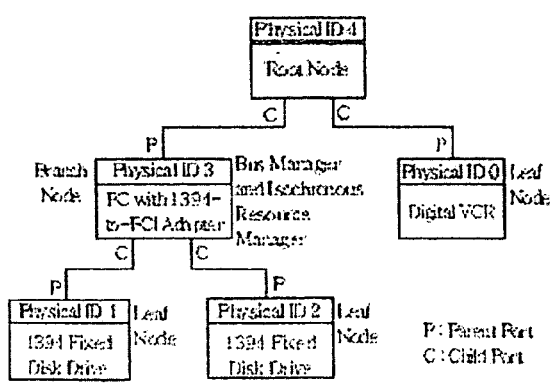
FIG. 3 is a structural diagram illustrating a node tree.
Figure 4:
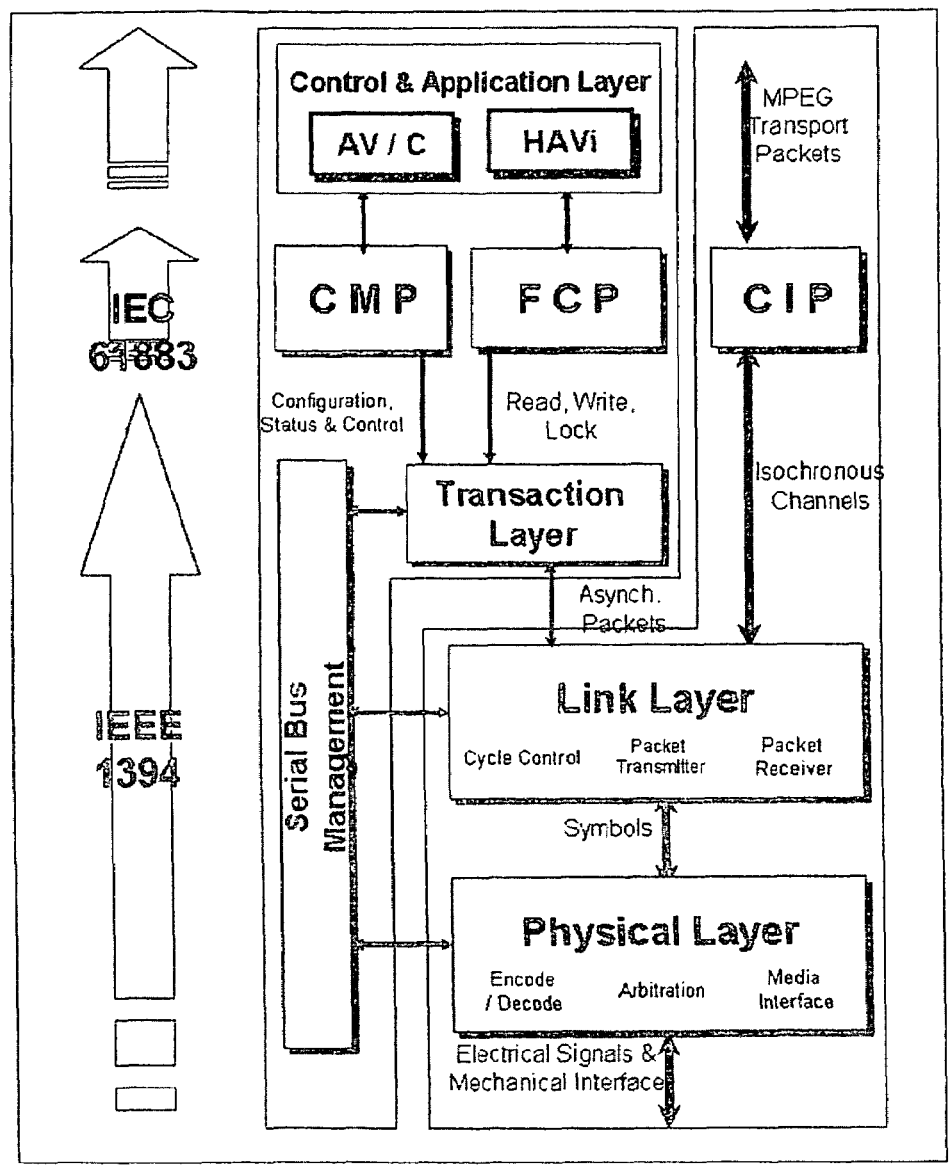
FIG. 4 shows the relationship among an IEEE 1394 specification, a general specification of AV/C digital interface command sets, an HAVi specification, and an IEC61883 specification.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

The present invention provides a new specification capable of discriminating between a HAVi command and an AV/C command, because the conventional method is unable to discriminate between the HAVi and AV/C commands using a CTS field.

In more detail, if a specific device is connected to a BAV device although it is implemented with the HAVi specification, it uses AV/C command sets according to the HAVi specification, such that a specific value "0X0000" acting as a command is recorded in a CTS field and the CTS field is no longer required.

When comparing the conventional CTS codes of FIG. 5 with new CTS codes of the present invention shown in FIG. 6, it can be recognized that an "0100" item denoted by "HAVi-AV/C" is further added in the CTS codes of the present invention. Therefore, according to the specification proposed by the present invention, the present invention conducts an AV/C code according to a predetermined AV/C process when a CTS code is determined to be the AV/C code, or conducts an HAVi code according to a predetermined HAVi process when a CTS code is determined to be the HAVi code in the same manner as in the aforementioned conventional method. However, if a CTS code corresponding to an HAVi-AV/C code is received, the present invention conducts commands associated with the received CTS code according to an HAVi process.

Figure 7:
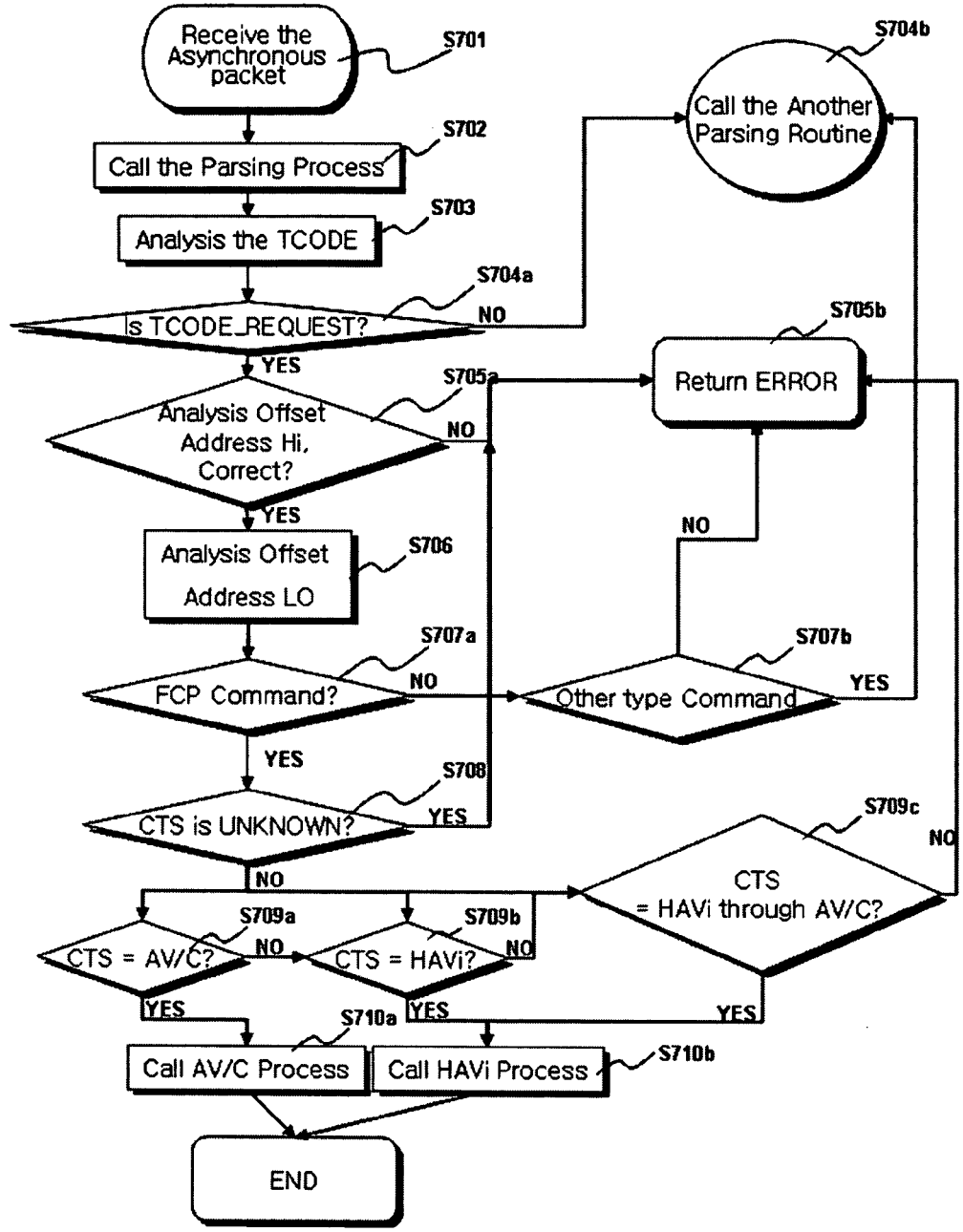
FIG. 7 shows a parsing algorithm associated with CTS fields in accordance with a preferred embodiment of the present invention.

FIG. 7 shows a parsing algorithm associated with CTS fields in accordance with a preferred embodiment of the present invention. The parsing algorithm determines whether a packet error occurs in packets received via the IEEE 1394 interface (I/F), determines whether the received packets are suitable for other conditions, and performs parsing of the HAVi-AV/C acting as a new CTS, such that it finally determines which one of specification is associated with the received packets. A detailed description will hereinafter be described with reference to FIG. 7.

Asynchronous packets are received at step S701. Packets transmitted from a link layer in IEEE 1394 environments are classified into physical (PHY) packets, primary packets, and acknowledgement packets. The primary packets are classified into asynchronous packets and isochronous packets. The present invention is designed to receive only the asynchronous packets. The asynchronous packets and the isochronous packets can be distinguished from each other by transaction codes.

A parsing process is called at step S702. The parsing process is adapted to analyze the received asynchronous packets.

A transaction code (TCODE) is analyzed at step S703. A large amount of information is contained in the asynchronous packets. A transaction code frame is contained in a first line shown in the packet configuration diagram of FIG. 5. The transaction code is indicative of a packet-type transaction code, and is contained in all primary packets.

Type information of the transaction code is analyzed at step S704a. The asynchronous packets are mainly classified into response packets and request packets. In this case, the term "request" indicates a specific operation state in which a transaction layer requests primary packet transmission via a bus from the link layer acting as a low order layer.

In this case, if the asynchronous packets are not associated with the above-mentioned request operation, another parsing process is called at step S704b.

Figure 8:
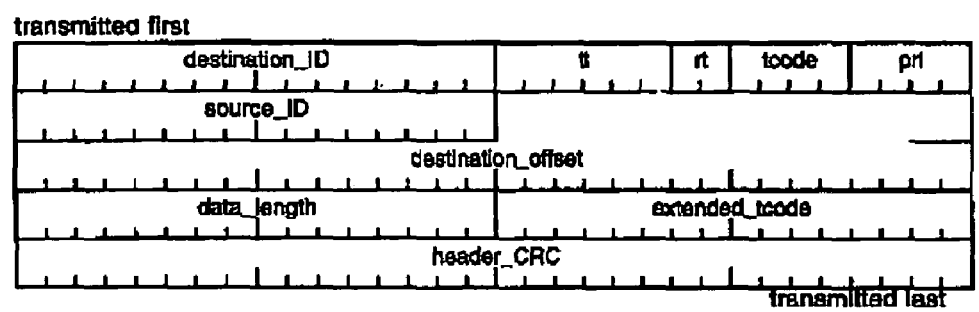
FIG. 8 is a structural diagram illustrating an asynchronous reception frame.

Offset address accuracy is determined at steps S705a and S706. A rear frame contained in a second line from among packets shown in FIG. 8 and frames contained in a third line are used for a reception area offset. The reception area offset is longer than other frames, such that the present invention determines a rear frame part of the second line to be a high-order address of the reception area offset, and primarily determines the accuracy of the determined frame part.

If the high-order address of the reception area offset is correct, a low-order address of the reception area offset in the third line is analyzed. In this case, if the high-order address of the reception area offset is not correct, the present invention transmits an error message.

It is determined whether a current frame is indicative of a command frame from among function control frames at step S707a. Although a variety of asynchronous packets implemented in the IEEE 1394 specification may be generated, the present invention extracts only a function control protocol capable of controlling devices interconnected via the IEEE 1394 bus. The function control protocols are classified into command frames and response frames. The present invention selects only the command frames from among the above-mentioned function control protocols.

In this case, the present invention determines whether the asynchronous packets are indicative of other command frames. If it is determined that the asynchronous packets are not equal to other command frames, another parsing process is called.

The present invention determines which specification is currently used via the CTS at steps S708~S710.

Provided that the CTS is well known in the art at step S708, the present invention determines whether a current CTS is determined to be the AV/C specification at step S709a, and determines whether a current CTS is determined to be the HAVi specification at step S709b. If the current CTS is determined to be the AV/C specification, the AV/C process is called at step S710a. If the current CTS is determined to be the HAVi-AV/C specification, the HAVi process is called at step S710b. Otherwise, if the current CTS is determined to be the HAVi-AV/C specification at step S709c, the HAVi process is also called at step S710b.

As apparent from the above description, when performing communication between different devices, each of which includes the HAVi specification and/or the AV/C specification, the present invention provides a method for controlling a device based on an IEEE 1394 interface, which determines which one of specifications is associated with a current command in a system in which HAVi and AV/C specifications are simultaneously implemented, correctly processes the current command according to the determined result, and allows different devices to be interoperable with each other via the IEEE 1394 interface.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling a device based on an IEEE 1394 interface, comprising the steps of:
   a) investigating by the device, a packet received from a counterpart device via the IEEE 1394 interface;
   b) parsing a control field of the packet, and identifying a specification applied to the device according to the control field, wherein the control field comprises a Command/Transaction Set (CTS) code selected from a group comprising a Home Audio Video Interoperability (HAVi) specification CTS code, an Audio Video/Control (AV/C) specification CTS code, and a HAVi through AV/C specification CTS code; and
   c) processing a command using a HAVi process, if the CTS code is the HAVi through AV/C specification CTS code.

2. The method according to claim 1, wherein the HAVi through AV/C specification CTS code comprises 4 bits having a value of 0100~1101.

3. The method according to claim 2, wherein the HAVi through AV/C specification CTS code has a value of 0100.

4. The method according to claim 1, wherein the received packet is indicative of an asynchronous packet.

5. The method according to claim 1, wherein the control field is a CTS field.

* * * * *